US008692705B2

(12) United States Patent
Smith et al.

(10) Patent No.: US 8,692,705 B2
(45) Date of Patent: Apr. 8, 2014

(54) APPARATUS AND METHOD FOR GENERATING LOW LATENCY POSITION INFORMATION FROM POSITION SIGNALS TRANSMITTED IN A NARROW BANDWIDTH CHANNEL OF A RADIO FREQUENCY (75) Inventors: Paul N. Smith, Cedar Rapids, IA (US); Timothy E. Snodgrass, Palo, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 379 days.

(21) Appl. No.: 13/238,799

(22) Filed: Sep. 21, 2011

(65) Prior Publication Data
US 2013/0069815 A1 Mar. 21, 2013

(51) Int. Cl.
*G01S 13/00* (2006.01)
*H04B 7/212* (2006.01)
*H04J 3/00* (2006.01)

(52) U.S. Cl.
USPC .......... 342/30; 342/29; 342/31; 342/36; 370/337; 370/345; 370/347; 370/442

(58) Field of Classification Search
USPC .......... 342/29–51, 175; 370/321, 337, 370/345–350, 442
See application file for complete search history.

(56) References Cited

U.S. PATENT DOCUMENTS

| | | | | |
|---|---|---|---|---|
| 3,573,818 A | * | 4/1971 | Lennon et al. | 342/29 |
| 3,801,979 A | * | 4/1974 | Chisholm | 342/31 |
| 5,043,903 A | * | 8/1991 | Constant | 701/300 |
| 5,153,836 A | * | 10/1992 | Fraughton et al. | 701/301 |
| 5,325,302 A | * | 6/1994 | Izidon et al. | 701/301 |
| 5,335,248 A | * | 8/1994 | Snodgrass | 375/152 |
| 5,392,450 A | * | 2/1995 | Nossen | 455/12.1 |
| 5,450,329 A | * | 9/1995 | Tanner | 701/467 |
| 5,506,587 A | * | 4/1996 | Lans | 342/357.31 |
| 5,521,925 A | * | 5/1996 | Merakos et al. | 370/337 |
| 5,636,123 A | * | 6/1997 | Rich et al. | 701/301 |
| 5,798,726 A | * | 8/1998 | Schuchman et al. | 342/37 |
| 6,072,433 A | * | 6/2000 | Young et al. | 342/386 |
| 6,313,783 B1 | * | 11/2001 | Kuntman et al. | 342/32 |
| 6,314,366 B1 | * | 11/2001 | Farmakis et al. | 701/482 |
| 6,330,247 B1 | * | 12/2001 | Chang et al. | 370/442 |
| 6,459,411 B2 | * | 10/2002 | Frazier et al. | 342/455 |

(Continued)

OTHER PUBLICATIONS

"Appendix C to the Report on Agenda Item 2", VDL Mode 4 Implementation Manual, Mar. 2, 2000, Draft, Unknown Publisher.

(Continued)

*Primary Examiner* — Peter Bythrow
(74) *Attorney, Agent, or Firm* — Donna P. Suchy; Daniel M. Barbieri (57) ABSTRACT Present novel and non-trivial apparatus and method for generating low latency position information from position signals transmitted in a narrow bandwidth channel of a radio frequency are disclosed. An aircraft (i.e., ownship) and each target (e.g., aircraft) of a time-division multiple access ("TDMA") network receives its respective position derived from its individual source such as a satellite navigation system. A processing module of a communication device installed in ownship and each target generate position signals, and during the allocated time slots of an interface protocol, exchange position information with the others in the network over a narrow bandwidth channel (e.g., bandwidths of 25 KHz or less) of a radio frequency in the VHF range or lower UHF range. The interface protocol may also be comprised of a voice contention time slot for the transmission of messages and an order wire for the administration of the network.

20 Claims, 4 Drawing Sheets

(56) References Cited

U.S. PATENT DOCUMENTS

| | | | |
|---|---|---|---|
| 6,483,454 B1* | 11/2002 | Torre et al. | 342/30 |
| 6,795,772 B2* | 9/2004 | Lin et al. | 701/301 |
| 6,911,936 B2* | 6/2005 | Stayton et al. | 342/182 |
| 7,133,395 B2* | 11/2006 | Simonsen et al. | 370/345 |
| 7,205,933 B1* | 4/2007 | Snodgrass | 342/148 |
| 7,313,143 B1* | 12/2007 | Bruno | 370/395.4 |
| 7,570,195 B2* | 8/2009 | Bartolini et al. | 342/37 |
| 7,583,641 B2* | 9/2009 | Lord | 370/337 |
| 7,697,493 B2* | 4/2010 | Ljungberg et al. | 370/338 |
| 7,840,355 B2* | 11/2010 | Breed et al. | 701/301 |
| 7,894,948 B2* | 2/2011 | Stroud | 701/3 |
| 8,294,596 B2* | 10/2012 | Lavielle et al. | 340/971 |
| 2003/0004642 A1* | 1/2003 | Lin et al. | 701/301 |
| 2003/0035406 A1* | 2/2003 | Fraser et al. | 370/347 |
| 2005/0230563 A1* | 10/2005 | Corcoran, III | 244/175 |
| 2008/0106457 A1* | 5/2008 | Bartolini et al. | 342/40 |
| 2009/0033540 A1* | 2/2009 | Breed et al. | 342/29 |
| 2009/0118875 A1* | 5/2009 | Stroud | 701/3 |
| 2010/0109936 A1* | 5/2010 | Levy | 342/30 |
| 2010/0292871 A1* | 11/2010 | Schultz et al. | 701/3 |
| 2011/0140950 A1* | 6/2011 | Andersson | 342/32 |
| 2013/0069815 A1* | 3/2013 | Smith et al. | 342/30 |

OTHER PUBLICATIONS

"MOPS for VDL Mode 4 Aircraft Transceiver Part 1: Core Requirements", May 19, 2004, Draft I 0.13A, The European Organisation for Civil Aviation Equipment.

"Manual on Detailed Technical Specifications for the VDL Mode 4 Digital Link", Nov. 25, 2003, Draft 2.1, Unknown Publisher.

* cited by examiner

APPARATUS AND METHOD FOR GENERATING LOW LATENCY POSITION INFORMATION FROM POSITION SIGNALS TRANSMITTED IN A NARROW BANDWIDTH CHANNEL OF A RADIO FREQUENCY

BACKGROUND OF THE INVENTION

1. Field of the Invention

This invention pertains generally to the field of aircraft traffic collision avoidance systems and/or position reporting systems.

2. Description of the Related Art

The ability to fly military aircraft in a close formation provides a tactical advantage to the pilots. Some aircraft, such as a helicopter, fly Nap-of-the-Earth which may be considered a type of very low-altitude course used by military aircraft to avoid enemy detection and attack in a high-threat environment. During NOE flight, geographical features are used as cover, exploiting valleys and folds in the terrain by flying in them rather than over them. Although preferable for many missions, it may not be possible for pilots to fly in a close formation where flight operations encounter "zero-visibility" conditions where pilots may lose sight of the other aircraft—even in close formation.

Link 16 is a military tactical data exchange network. With Link 16, military aircraft, ships, and ground forces may exchange their tactical picture in near-real time. Also, Link 16 supports the exchange of text messages, imagery data, and provides two channels of digital voice (2.4 kilobits per second ("kbps") and/or 16 kbps in any combination). Link 16 operates in the radio navigation frequency band between 960 MHz and 1215 MHz, inclusive, a band of frequencies within the upper UHF frequency range. In Link 16, information is typically passed at one of three data or symbol rates: 31.6 kbps, 57.6 kbps, or 115.2 kbps, although the radios and waveforms can support throughputs of 238 kbps.

Link 16 information is primarily coded in a "J-series messages" protocol comprised of binary data words. These data words are grouped in functional areas and allocated to network participating groups, i.e., virtual networks, such as, but not limited to, Precise Participant Location and Identification ("PPLI") (categorized as network participation groups 5 and 6), Surveillance (group 7), Command or Mission Management/Weapons Coordination (group 8), Aircraft Control (group 9) and Electronic Warfare and Coordination (group 10).

Multifunction Advanced Data Link ("MFDL") is comprised of remote electronics. MFDL systems include phased Array Antenna Assemblies ("AAA") and three Antenna Interface Units ("AIUs"), and allow aircraft to communicate within and between flight groups in order to share a common view of the battle space.

A Traffic Collision Avoidance System ("TCAS") is an aircraft system designed to reduce the incidence of mid-air collisions. The system monitors the airspace surrounding the aircraft for other aircraft equipped with an active transponder that is independent of air traffic control. With such system, pilots may be alerted of the presence of other transponder-equipped aircraft. The system may be comprised of a TCAS computer unit, antennas, and a display unit. The TCAS computer unit performs, in part, airspace surveillance. The antennas may include a directional antenna mounted to the top of the aircraft and either an omnidirectional or a directional antenna mounted to the bottom of the aircraft. Two additional antennas are required for a Mode S transponder, where one antenna is mounted to the top of the aircraft and the other is mounted to the bottom. These Mode S antennas enable the Mode S transponder to receive interrogations at the radio frequency of 1030 MHz and reply to the received interrogations at 1090 MHz.

An Automatic Dependent Surveillance-Broadcast ("ADS-B") system is a surveillance system for tracking aircraft. The ADS-B may be comprised of three components: a transmitting subsystem which includes message generation and transmission functions at ownship, a transport protocol comprised of a VHF datalink ("VDL"), a 1090 MHz Mode S Extended Squitter ("ES"), a Universal Access Transceiver ("UAT"), and a receiving subsystem which includes message reception and report assembly functions at the receiving destination such as target aircraft.

The VDL provides a means of sending information between aircraft and ground stations. In VDL Mode 4, aircraft use a band of frequencies between 117.975 MHz and 137 MHz in the VHF frequency range to send messages between large numbers of aircraft as well as a ground station. VDL Mode 4 employs a Self-Organized Time-Division Multiple Access ("STDMA") protocol that allows a means for self-organizing or managing a network of aircraft employing the STDMA protocol. The STDMA protocol divides channel time into fixed-length time slots. An important term in VOL Mode 4 channel management is "superframe" which consists of a group of slots that span a period of 60 seconds, an extremely high latency rate. The superframe contains a default number of 4,500 slots, an equivalent of 75 slots per second.

An important feature of the protocol is the method used to select slots of a new transmission for placing reservation for future transmissions. The method includes "slot idle/busy notifications" where a station is considered "idle" if an idle/busy status is idle at the start of the slot, "busy" if the status is busy, or "occupied" if the channel is continuously busy for a period of at least 5 milliseconds during the slot. When a channel is not busy, slot selection is straightforward since a slot that has not been previously reserved by another station can be easily found. When a channel becomes busier such that unreserved slots are harder to find, the protocol of VDL Mode 4 allows a station (e.g., aircraft) or ground station to use a slot previously reserved by another distant station. The result is that the coverage area of a station reduces in range gracefully as the channel becomes busy and there is no sudden reduction in the ability to communicate. A further advantage is that slot selection is carried out by all stations and there is no reliance on a ground station to carry out channel resource management, although in some circumstances, a ground station may be used to allocate slots.

The slot selection process consists of three steps. First, an application wishing to send data or to place a reservation to send data in the future first specifies a range of candidate slots from which a slot will be chosen. Second, the station then derives a list of available slots. The available slots are a subset of the candidate slots and consist of slots that are either unreserved or which, although previously reserved by another station, can be made available for use. Before a slot is finally selected, it is important to derive a number of available slots, typically 4, in order to reduce the possibility of more than one station selecting the same slot. For example, if there was only one unreserved slot among the candidate slots, there would be a high chance of more than one station choosing that slot, causing garbling of that slot. Third, a slot is selected randomly from the available slots.

The protocol of VDL Mode 4 allows for the use of previously reserved slots by employing the two guiding principles known as Robin Hood and Co-Channel Interference ("CCI")

protection. The Robin Hood principle allows a station operating on a busy channel to use slots previously reserved for broadcast transmission by another station as long as slots reserved by the most distant stations are chosen in preference to those of nearer stations. This results in a graceful reduction in the broadcast range of a station on busy channels. The CCI protection principle generalizes the Robin Hood principle to allow slots previously reserved for point-to-point communication between two stations to be used by another station. CCI protection is based on relative aircraft distance and assumes that even though stations may be in radio range of each other, each station can successfully discriminate the desired (stronger) signals over the undesired (weaker) ones. VDL Mode 4 defines a measure of the CCI on the basis of free space attenuation of signals with distance.

Although the STDMA protocol is appropriate for situations in which there are a large number of aircraft, it is inadequate for formation flying due to the extremely high latency rates and the complexity of the protocol.

BRIEF SUMMARY OF THE INVENTION

The embodiments disclosed herein present at least one novel and non-trivial apparatus and method for generating position information from position signals transmitted in a narrow bandwidth channel of a radio frequency. The apparatus and method provide low latency situational awareness information to the members of a flight group by using existing narrow bandwidth communication radios to generate position information of each member of the flight group by forming a time-division multiple access ("TDMA") network through the use of an interface protocol disclosed herein. Software in existing processor-controlled communication radios may be upgraded with the interface protocol disclosed herein and/or new processor-controlled communication radios may be manufactured to implement the interface protocol disclosed herein.

In one embodiment, a method for generating low latency position information from position signals transmitted in a narrow bandwidth channel of a radio frequency is disclosed. This method may be comprised of receiving position data from a navigation data source, generating an ownship position signal, transmitting the ownship position signal to the comparable processing module of each target communication device during an allocated time slot in accordance with an interface protocol employed by ownship and all member target(s) of the network, receiving one or more target position signals, and generating target data representative of the position of each target within the network. Additionally, this method could include the providing of the target data to one or more user systems such as a display unit and/or a target awareness and warning system.

In another embodiment, an apparatus for generating low latency position information from position signals transmitted in a narrow bandwidth channel of a radio frequency is disclosed. The apparatus may be comprised of a processing module configured to perform the method as discussed in the preceding paragraph.

DETAILED DESCRIPTION OF THE INVENTION

In the following description, several specific details are presented to provide a thorough understanding of embodiments of the invention. One skilled in the relevant art will recognize, however, that the invention can be practiced without one or more of the specific details, or in combination with other components, etc. In other instances, well-known implementations or operations are not shown or described in detail to avoid obscuring aspects of various embodiments of the invention.

Figure 1:
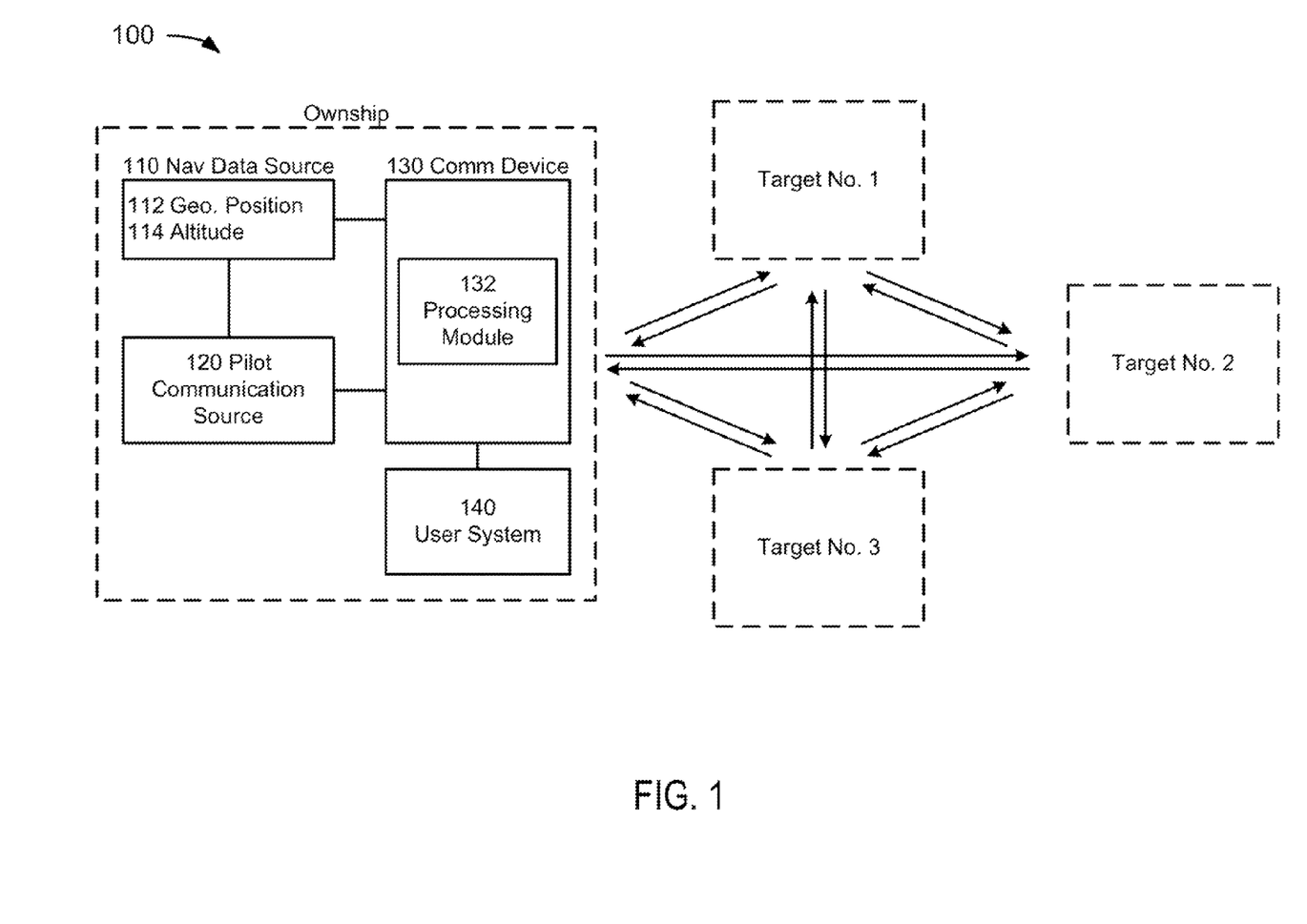
FIG. 1 depicts a block diagram of a position information generating network.
Figure 2:
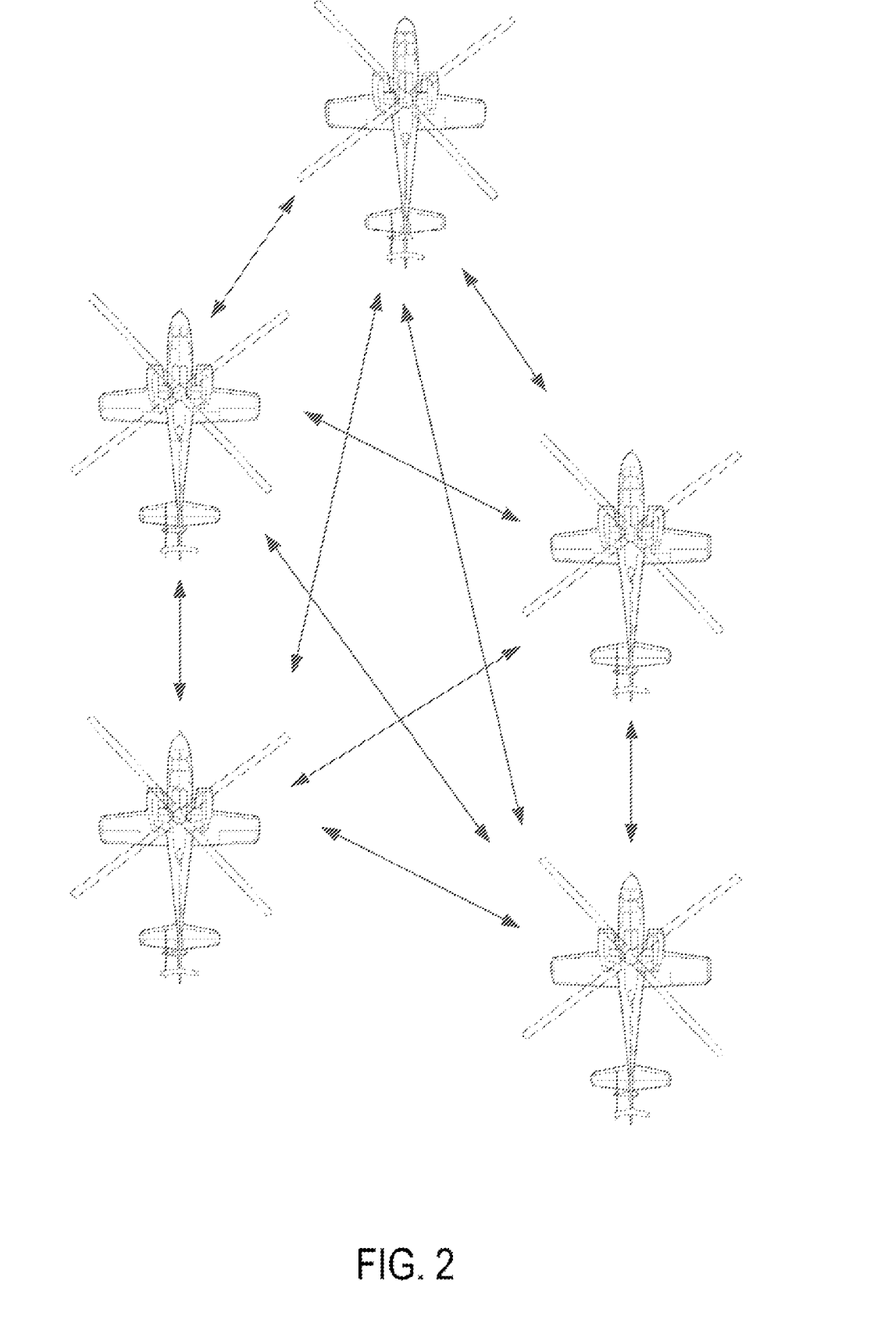
FIG. 2 depicts a close formation of helicopters for the employment of the disclosed embodiments.

FIG. 1 depicts a block diagram of a target position information generating network 100 suitable for implementation of the techniques described herein. An ownship and at least one target may be used to form a network which shares the same frequency channel, wherein each is comprised of a navigation data source 110, a pilot communication source 120, a communication device 130, and a user system 140. A helicopter formation such as the formation shown in FIG. 2 could utilize such network.

Returning to FIG. 1, the navigation data source 110 may be comprised of one or more systems for acquiring and providing navigation data to any aircraft system requiring an input of navigation data. As embodied herein, data could be comprised of any analog or digital signal, either discrete or continuous, which could contain information. As embodied herein, signals are synonymous with data. In addition, aircraft could mean any manned aerial vehicle or unmanned aerial vehicle ("UAV") which is able to fly through the air, atmosphere, and/or space including, but not limited to, lighter than air vehicles and heavier than air vehicles, wherein the latter may include fixed-wing and rotary-wing vehicles. Additionally, aircraft could be watercraft capable of operating on water.

The navigation data source 110 may include, but is not limited to, a global navigation satellite system ("GNSS") (or satellite navigation system), an attitude heading reference system, an inertial guidance system (or inertial reference system), an air/data system, and/or a flight management computing system ("FMCS"), all of which are known to those skilled in the art. As embodied herein, the navigation data source 110 could be a source installed in an aircraft (i.e., ownship) for acquiring navigation data of ownship position including, but not limited to, ownship location 112 (e.g., latitude and longitude coordinates) and/or ownship altitude 114. Additionally, velocity could be included if needed because of latency. Once acquired, the navigation data source 110 could provide ownship position data to the processing module 132 of the communication device 130 for subsequent generation and transmission of an ownship position signal to the processing module(s) of the target communication device(s) of the network.

It should be noted that, although the discussion of the network herein will be drawn to airborne platforms referred to as ownship and target, the embodiments disclosed herein are not limited to such airborne platforms used to form the network. For example, ownship and/or target(s) may be located on the ground. For example, a forward observer may be located on the ground who is there to coordinate the use of military weaponry and may be included in the network comprised mainly of weapon delivery systems (e.g. aircraft) so that his position is shared with the others in the network and/or visa versa. In addition, the embodiments herein are not limited to military applications but could include civilian applications such as, but not limited to, one or more types of traffic surveillance systems.

In an embodiment of FIG. 1, the pilot communication source 120 could comprise any device through which a pilot may communicate a spoken and/or non-spoken message. The pilot may communicate a spoken message through a microphone, where such message is subsequently transmitted over one or more frequencies assigned to the network. Also, the pilot may communicate a non-spoken message with a device such as, but are not limited to, a tactile device (e.g., keyboard, control display unit, cursor control device, touch screen device, etc. . . . ) and/or voice recognition system through which a pilot and/or another aircraft system may initiate the generation of non-spoken message data. As embodied herein, the pilot communication source 120 may not be a stand-alone device but could be incorporated into another system; for example, the tactile device could be incorporated into the FMCS of the navigation data source 110. Once initiated, spoken and/or non-spoken messages received via the pilot communication source 120 could be provided directly and/or indirectly to the processing module 132 of the communication device 130 for subsequent generation and transmission of a pilot-initiated signal representative of the spoken and/or non-spoken messages to the processing module(s) of the target communication device(s) of the network.

In an embodiment of FIG. 1, the communication device 130 may be comprised of a processing module ("PM") 132, where the PM 132 may be any electronic data processing unit or combination of electronic data units which execute software or source code stored, permanently or temporarily, in a digital memory storage device as discussed above. The PM 132 may be driven by the execution of software or source code containing algorithms developed for the specific functions embodied herein. Common examples of electronic data processing units are microprocessors, Digital Signal Processors, Programmable Logic Devices, Programmable Gate Arrays, and signal generators; however, for the embodiments herein, the term generator is not limited to such processing units and its meaning is not intended to be construed narrowly. The PM 132 may be programmed to execute the method embodied herein and discussed in detail below.

The PM 132 may be programmed or configured to receive position data from the navigation data source 110 and messages from the pilot communication device 120. Also, the PM 132 may be programmed to generate, transmit, and receive position signals over a narrow bandwidth channel of a radio frequency using a predefined interface protocol discussed in detail below. Also, the PM 132 may be programmed or configured to generate position data representative of the position signals and provide such data to one or more user systems 140.

As embodied herein, the terms "programmed" and "configured" are synonymous with respect to the execution of software or source code developed for the specific functions and methods embodied herein. The PM 132 may be electronically coupled to systems and/or sources to facilitate the receipt and providing of data; as embodied herein, operatively coupled may be considered as interchangeable with electronically coupled. It is not necessary that a direct connection be made; instead, such receipt of input data and the providing of output data could be provided through a data bus or through a wireless network.

In an embodiment of FIG. 1, the user system 140 may be comprised of any unit that employs position information. A non-exhaustive list of user systems could include a display unit for presenting position information of target(s), a target awareness and warning system for generating one or more alerts, an FMCS, and/or an autoflight control system ("AFCS"). A non-exhaustive list of display units includes a primary flight director, navigation display, head-up display, head-down display, multi-purpose control display unit, multi-function display, side displays, and data link control display unit. Also, the display unit could be incorporated into another system; for example, the display unit could be incorporated into the FMCS of the navigation data source 110 and/or could be the pilot communication device 120 comprised of a touch screen device. The target awareness and warning system could be one or more units used for generating one or more generate visual alerts, aural alerts, and/or tactile alerts that are presented to the pilot when necessary.

Figure 3:
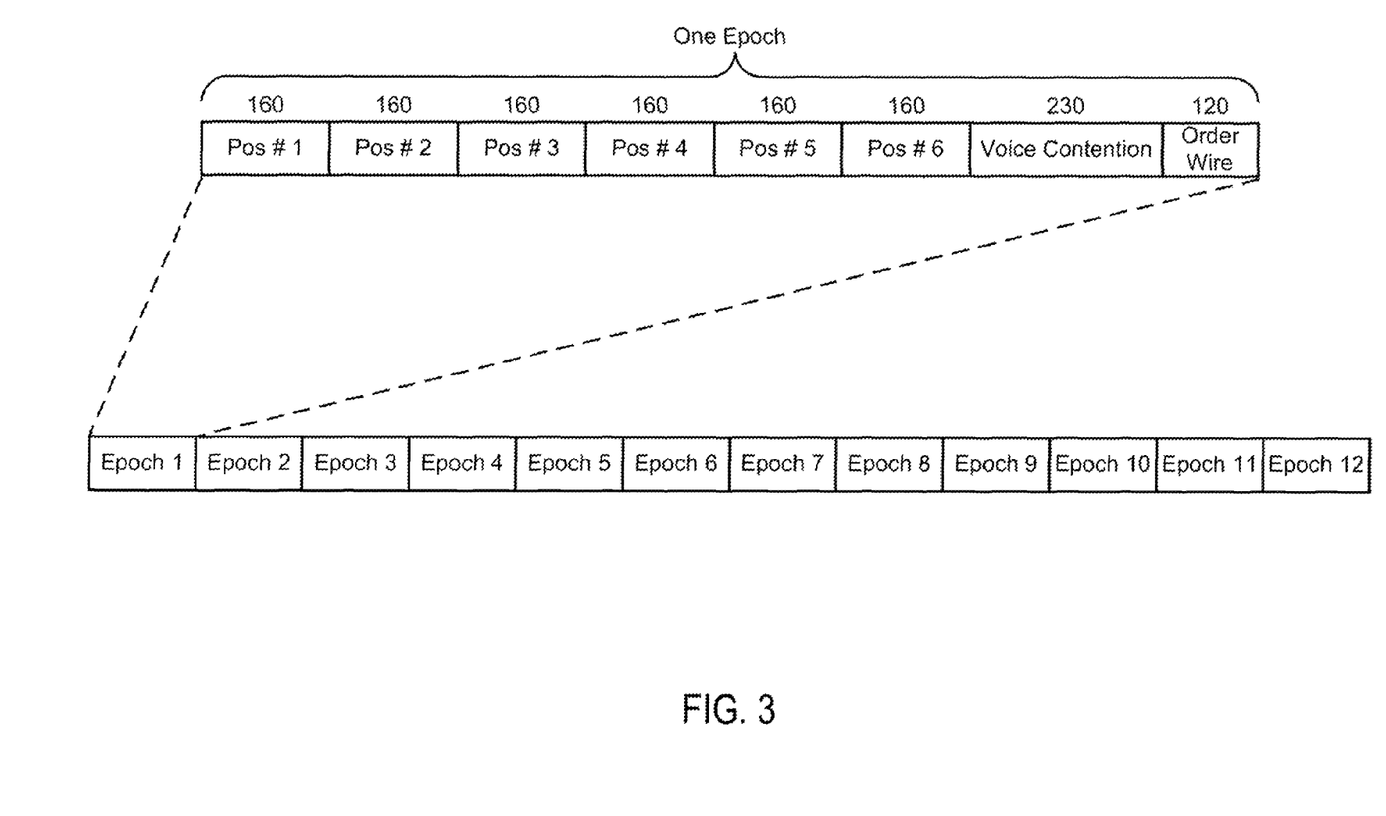
FIG. 3 depicts an interface protocol for the exchange of position information between the members of the network.

In an embodiment of FIG. 3, an exemplary interface protocol employed by the PM 132 of the communication device 130 of ownship and each target of the network is disclosed. The use of the interface protocol allows ownship and at least one target to share the same frequency by dividing a radio frequency signal into a plurality of time slots. Referring to FIG. 3, an epoch of the interface protocol is divided into an allocation of eight time slots: six allocated position time slots, a voice contention time slot, and an order wire time slot. As shown, the size of each position time slot is 160 bits, the voice contention time slot is 230 bits, and the order wire time slot is 120 bits. This means that the length of each epoch is 1310 bits; for twelve epochs, the length is 15,720 bits. If the PM 132 of each communications device 130 of the network is configured to transmit and receive over a narrow bandwidth (e.g., 25 KHz) channel, a digital modulation symbol rate of 16 kilobits per second ("kbps") may be employed. At this symbol rate and employing the disclosed interface protocol, each of the six aircraft will exchange its position information with the five other aircraft 12 times per second. As such, low latency position reporting may be obtained. Also, a 2.4 kbps voice contention time slot is provided to the network for the transmission of spoken and/or non-spoken messages, and a 1.4 kbps order wire is provided for the transmission of network administration information. Non-spoken messages could include the transmission of data representative of formation information of a formation comprised of manned aerial vehicles and/or UAVs, where one "master" aircraft of the formation may transmit formation-related data (e.g., number of aircraft in formation, position of each aircraft within the formation, relative spacing, altitude, etc. . . . ) to the other "slave" aircraft. Each slave aircraft may provide to the AFCS the position information received in the position time slots and slaved formation information received in the voice contention time slot to form an automatically-piloted "slaved formation" responsive to the master aircraft.

The interface protocol is adaptable for fixing or varying the allocation of time slots. The PM 132 may be configured to generate a fixed number of time slots. As shown in FIG. 3, the numbers of position, voice contention, and order wire time slots are 6-1-1, respectively. This time slot allocation could be fixed to be 2-1-1 where a flight group for a specific mission is comprised of two helicopters. In such a case, the length of each epoch would be 670 bits. With the narrow bandwidth of 25 KHz and the symbol rate of 16 kbps, an exchange of position information will occur 23 times per second, thereby obtaining a lower latency than discussed above. For a flight group comprised of twelve helicopters, the time slot allocation could be set to 12-1-1. If so, the length of each epoch would be 2270 bits which means an exchange of position information occurring seven times per second.

The PM 132 may be configured to generate position time slots without the voice contention time slot and/or the order wire time slot. An absence of the voice contention time slots may mean the inability for one aircraft to transmit spoken and/or non-spoken messages with the other aircraft. An absence of the order wire time slot may mean the inability for network administration (e.g., allow other aircraft to join an established network). Time slot allocations of 2-0-1, 2-1-0, and 2-0-0 would result in epoch lengths of 440 bits, 550 bits, and 320 bits, respectively. If so, the exchange of position information would occur 36, 29, and 50 times per second, respectively, thereby obtaining extremely low latencies. Time slot allocations of 12-0-1, 12-1-0, and 12-0-0 would result in epoch lengths of 2040 bits, 2150 bits, and 1920 bits, respectively. If so, the exchange of position information would occur 8, 7, and 8 times per second, respectively, higher latencies that the time slot allocation of 6-1-1.

Instead of generating a fixed number of time slots, the PM 132 may be configured to generate a variable number of time slots, where the variability could be accommodated through the use of the information transmitted via the order wire. Aircraft may join or leave an existing network through one or more automated network administration transactions performed during the order wire time slot that may be transparent to the pilot. As aircraft join, the number of position time slots could increase, thereby increasing the epoch length and decreasing the number of position information exchanges between the aircraft; as aircraft leave, the number of position time slots could decrease, thereby decreasing the epoch length and increasing the number of position information exchanges.

The order wire time slot could provide a decentralized, collaborative, and/or distributed control of the network such that no one communication device 130 controls the network. Within the order wire time slot, each communication device of the network may be allocated one unique position reporting time slot. Communication devices may enter and exit the network through a collaborative effort of some or all of the communication devices in the network. Moreover, because the order wire is a time slot set aside specifically for network administration, it may be configured as a contention slot where there may be no transmission or exchange of data until it is necessary to transact network administration data. As such, the interface protocol may not need to provide idle or busy notifications for position reporting time slots or determine whether such time slots are occupied. Instead, the order wire time slot could be used to allocate a position reporting time slot from a previously-determined (i.e., non-random) allocation where the fixed interface protocol configured with a fixed number of position reporting time slots and/or expand a variable interface protocol to accommodate a new position reporting time slot when the communication device 130 seeks to join the network; similarly, the order wire time slot could be used to remove an allocated position reporting time slot from the fixed interface protocol and/or contract the variable interface protocol to accommodate the loss of a position reporting time slot when the communication device 130 seeks to leave the network.

With respect to the voice contention and order wire time slots, the size of each of these may be variable. That is, the size of each may be increased or decreased if needed.

Although the examples discussed in the preceding paragraphs have been drawn to a fixed narrow bandwidth of 25 KHz and a fixed symbol rate of 16 kbps, the PM 132 may be configured to vary the narrow bandwidth channel and/or symbol rate as it employs the interface protocol. Besides the narrow bandwidth of 25 KHz, a narrow bandwidth could include a plurality of bandwidths such as, but not limited to, 12.5 KHz, 8.333 KHz, 6.25 KHz, and 5 KHz, and a plurality of symbol rates such as, but not limited to, 8.0 kbps 5.3 kbps, 4.0 kbps, and 3.2 kbps, respectively, when a factor of 0.64 is applied. If a symbol rate of 8.0 kbps is employed with a narrow bandwidth of 12.5 KHz and a time slot allocation of 6-1-1 corresponds to the epoch length of 1310 bits, each of the six aircraft will exchange its position information with the five other aircraft 6 times per second. If a symbol rate of 5.3 kbps is employed with a narrow bandwidth of 8.33 KHz, the exchange will occur 4 times per second. If a symbol rate of 3.2 kbps is employed with a narrow bandwidth of 5 KHz, the exchange will occur 2 times per second, a relatively high latency.

It should be noted that, even though position information may be exchanged, i.e., refreshed, at the relatively higher latencies for narrower bandwidths and/or for increased number of position time slots, such latencies may still not affect the ability of pilots and/or auto pilots to operate their helicopters while flying in close formation and "in the blind." Although position information of the other helicopters may be presented on the display unit and refreshed at a relatively high latency (e.g., 2 times per second), this could mean an increase to a minimum spacing requirement between the helicopters or a decrease in the maximum number of aircraft allowed to fly in the formation.

Figure 4:
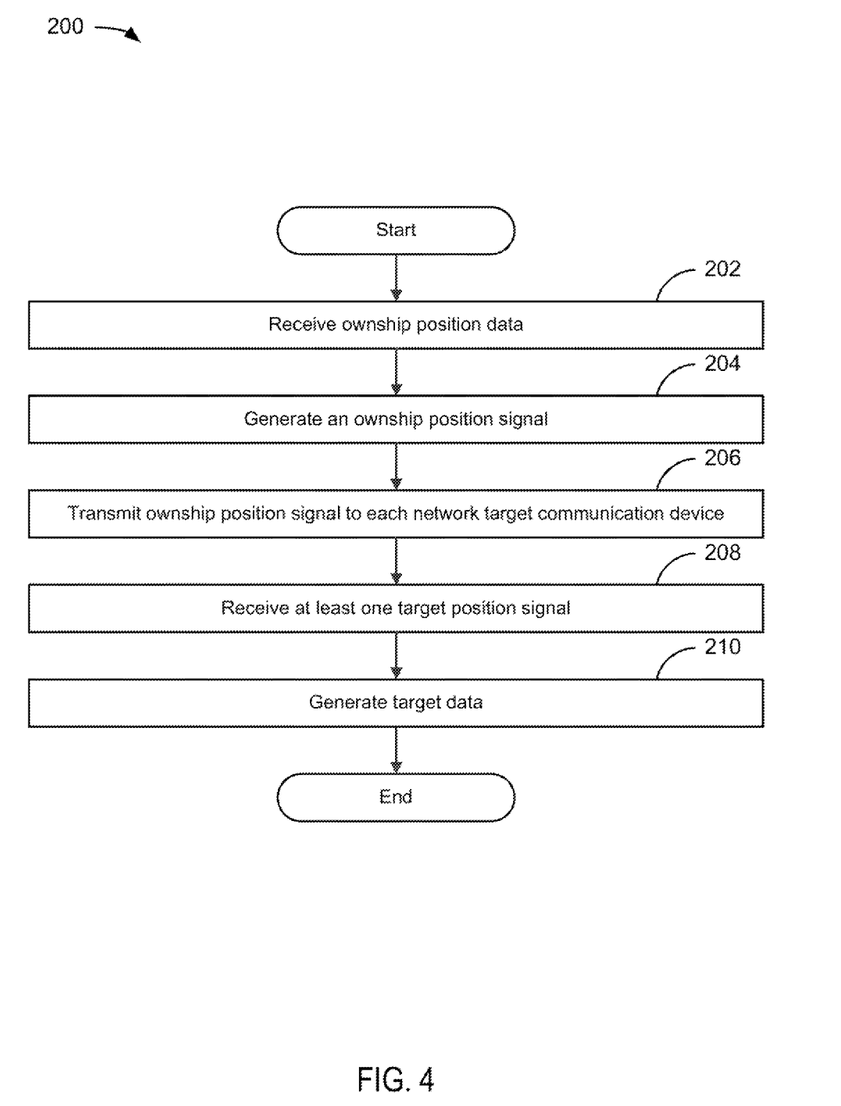
FIG. 4 depicts a flowchart of a method employing the interface protocol.

FIG. 4 depicts a flowchart 200 of an example of a method for generating data representative of target position information from position signals transmitted in a narrow bandwidth channel of a radio frequency, where the PM 132 may be programmed or configured with instructions corresponding to the following modules. As necessary for the accomplishment of the following modules embodied in FIG. 4, the receiving of data is synonymous and/or interchangeable with the retrieving of data.

FIG. 4 depicts a flowchart 200 of an example of the method. The flowchart begins with module 202 with the receiving of data representative of ownship position from the navigation data source 110. Ownship position may be determined from signals provided by a satellite navigation system from which ownship may determine its position.

The flowchart continues with module 204 with the generating of an ownship position signal representative of ownship position. The ownship position signal may be generated in a narrow bandwidth channel of a radio frequency. A maximum narrow bandwidth of 25 KHz could be set, and the channel could be selected from a band of the VHF frequency range or the lower UHF frequency range. For example, the VHF frequency range could be between 30 MHz and 88 MHz, inclusive, and the UHF frequency range could be between 225 and 400 MHz, inclusive.

The flowchart continues with module 206 with the transmitting of the ownship position signal to a processing module of each target communication device of a network in accordance with the interface protocol. Here, the interface protocol may be comprised of a plurality of time slots. The ownship position signal could be transmitted to the network during the position time slot allocated to the ownship PM 132 through the use of an allocation of time slots; that is, if the time slot allocated to the PM 132 has been reached, the ownship position signal may be transmitted to the network. With the employment of the interface protocol, the PM of each target communication device of the network could receive the ownship position signal during this time.

As stated above, the number of position time slots may be fixed or variable. If fixed, the interface protocol may not include an order wire time slot. If the number is variable, an order wire time slot may be included in the interface protocol so that network administration techniques known to those skilled in the art may be employed to expand or contract the interface protocol as targets join or leave the network. Whether the number of time slots is fixed or variable, the order wire time slot may be the slot within which each communication device of the network is allocated one unique position reporting time slot. Additionally, the interface protocol may not include a voice contention time slot. If a mission does not permit any pilot to initiate spoken message and non-spoken messages, a voice contention time slot may not be necessary.

The flowchart continues with module 208 with the receiving of at least one target position signal, where the number of target position signals received may depend upon the number of targets in the network. Similar to the transmission of the ownship position signal, each target position signal could be transmitted to the network during the position time slot allocated to the respective PM in the interface protocol. The target position signal could have been generated and transmitted in the same manner as the ownship position signal. The target PM could have been configured to receive data representative of ownship position from its navigation data source, generate target position signal representative of the navigation data, and transmit the target position signal during its allotted position time slot in accordance with the interface protocol.

The flowchart continues with module 210 with the generating target data for each received target position signal. After being generated, such target data may be provided to one or more user systems which, in turn, may employ such data to provide position information to the pilot as discussed above. Then, the flowchart proceeds to the end.

It should be noted that the methods described above may be embodied in computer-readable media as computer instruction code. It shall be appreciated to those skilled in the art that not all method steps described must be performed, nor must they be performed in the order stated.

As used herein, the term "embodiment" means an embodiment that serves to illustrate by way of example but not limitation.

It will be appreciated to those skilled in the art that the preceding examples and embodiments are exemplary and not limiting to the scope of the present invention. It is intended that all permutations, enhancements, equivalents, and improvements thereto that are apparent to those skilled in the art upon a reading of the specification and a study of the drawings are included within the true spirit and scope of the present invention. It is therefore intended that the following appended claims include all such modifications, permutations and equivalents as fall within the true spirit and scope of the present invention.

What is claimed is:

1. An apparatus for generating low latency position information from position signals transmitted in a narrow bandwidth channel of a radio frequency, such apparatus comprising:
    a processing module of an ownship communication device configured to
        receive data representative of ownship position from a navigation data source;
        generate an ownship position signal representative of ownship position;
        transmit the ownship position signal to a processing module of each target communication device of a network if a position reporting time slot allocated to the ownship communication device in an interface protocol has been reached, where
            the network is comprised of the ownship communication device and at least one target communication device,
            the ownship communication device and each target communication device employ the interface protocol,
            the interface protocol is defined by a plurality of time slots comprised of
                a plurality of position reporting time slots,
                a voice contention time slot, and
                an order wire time slot within which each communication device of the network is allocated one unique position reporting time slot, and
            each position signal is transmitted in a narrow bandwidth channel of a radio frequency;
        receive at least one target position signal, where
            each target position signal is transmitted by the processing module of one target communication device if the position reporting time slot allocated to such target communication device in the interface protocol has been reached; and
        generate target data representative of each received target position signal, where
            the target data is representative of low latency position information of at least one target.

2. The apparatus of claim 1, wherein
    the total number of time slots is correlated to the width of the narrow bandwidth, and
    the width of the narrow bandwidth limits the total number of time slots.

3. The apparatus of claim 1, wherein the low latency is a latency suitable for formation flight.

4. The apparatus of claim 1, wherein
    the voice contention time slot is available to the ownship communication device and each target communication device for the transmission of a pilot-initiated signal other than the ownship position signal, each target position signal, and a network administration signal, and
    the order wire time slot is available to the ownship communication device and each target communication device for the transmission of the network administration signal representative of organization and management information of the network.

5. The apparatus of claim 4, wherein the pilot-initiated signal is representative of a spoken message data or non-spoken message data.

6. The apparatus of claim 4, wherein the number of position reporting time slots is fixed or variable, where the variability in the number of time slots is dependent upon the number of target communication devices in the network as determined from the network administration data.

7. The apparatus of claim 1, wherein the radio frequency is a frequency within the VHF frequency range or the lower UHF frequency range with a maximum narrow bandwidth channel of 25 KHz.

8. The apparatus of claim 7, wherein
    the VHF frequency range is between 30 MHz to 88 MHz, inclusive, and
    the lower UHF frequency range is between 225 MHz and 400 MHz, inclusive.

9. The apparatus of claim 1, wherein the processing module of each target communication device has been configured to
    receive data representative of target position from a navigation data source of the target,
    generate a target position signal representative of target position, and transmit the target position signal to a processing module of at least one other target communication device of a network.

10. The apparatus of claim 1, wherein the processing module of the ownship communication device has been further configured to
provide the target data to a user system, where such user system is comprised of at least
a display unit for presenting position information visually on a screen of the display unit, or
a target awareness and warning system for generating at least one alert visually, aurally, tactilely, or any combination of these.

11. A method for generating low latency position information from position signals transmitted in a narrow bandwidth channel of a radio frequency, such method comprising:
receiving data representative of ownship position from a navigation data source;
generating an ownship position signal representative of ownship position;
transmitting the ownship position signal to a processing module of each target communication device of a network if a position reporting time slot allocated to the ownship communication device in an interface protocol has been reached, where
the network is comprised of the ownship communication device and at least one target communication device,
the ownship communication device and each target communication device employ the interface protocol,
the interface protocol is defined by a plurality of time slots comprised of
a plurality of position reporting time slots,
a voice contention time slot, and
an order wire time slot within which each communication device of the network is allocated one unique position reporting time slot, and
each position signal is transmitted in a narrow bandwidth channel of a radio frequency;
receiving at least one target position signal, where
each target position signal is transmitted by the processing module of one target communication device if the position reporting time slot allocated to such target communication device in the interface protocol has been reached; and
generating target data representative of each received target position signal, where
the target data is representative of low latency position information of at least one target.

12. The method of claim 11, wherein
the total number of time slots is correlated to the width of the narrow bandwidth, and
the width of the narrow bandwidth limits the total number of time slots.

13. The method of claim 11, wherein the low latency is a latency suitable for formation flight.

14. The method of claim 11, wherein
the voice contention time slot is available to the ownship communication device and each target communication device for the transmission of a pilot-initiated signal other than the ownship position signal, each target position signal, and a network administration signal, and
the order wire time slot is available to the ownship communication device and each target communication device for the transmission of the network administration signal representative of organization and management information of the network.

15. The apparatus of claim 4, wherein the pilot-initiated signal is representative of a spoken message data or non-spoken message data.

16. The apparatus of claim 4, wherein the number of position reporting time slots is fixed or variable, where the variability in the number of time slots is dependent upon the number of target communication devices in the network as determined from the network administration data.

17. The method of claim 11, wherein the radio frequency is a frequency within the VHF frequency range or the lower UHF frequency range with a maximum narrow bandwidth channel of 25 KHz.

18. The method of claim 17, wherein
the VHF frequency range is between 30 MHz to 88 MHz, inclusive, and
the lower UHF frequency range is between 225 MHz and 400 MHz, inclusive.

19. The method of claim 11, wherein
the processing module of each second communication device has been configured for
receiving data representative of target position from a navigation data source of the target,
generating a target position signal representative of target position, and
transmitting the target position signal to a processing module of at least one other target communication device of a network.

20. The method of claim 11, further comprising:
providing the target data to a user system, where such user system is comprised of at least
a display unit for presenting position information visually on a screen of the display unit, or
a target awareness and warning system for generating at least one alert visually, aurally, tactilely, or any combination of these.

* * * * *